United States Patent [19]

Bright

[11] 4,074,465
[45] Feb. 21, 1978

[54] FLEXIBLE CHANNEL-SHAPED SEALING AND GUIDING STRIPS

[75] Inventor: Robert G. Bright, Viersen, Germany

[73] Assignee: Draftex Development AG, Switzerland

[21] Appl. No.: 647,183

[22] Filed: Jan. 7, 1976

[30] Foreign Application Priority Data

Jan. 9, 1975 United Kingdom .................. 888/75

[51] Int. Cl.² ............................................... E06B 7/16
[52] U.S. Cl. .................................. 49/491; 24/73 FT; 24/81 FT; 49/440
[58] Field of Search ........................ 49/491, 440, 490; 24/269 TF, 269 WC, 262, 73 FT, 252 R, 259, 81 FT

[56] References Cited

U.S. PATENT DOCUMENTS 2,412,796  12/1946  Bascom ............................. 49/440 X

FOREIGN PATENT DOCUMENTS 503,355  4/1939  United Kingdom .................. 49/440

Primary Examiner—Kenneth Downey
Attorney, Agent, or Firm—Leydig, Voit, Osann, Mayer & Holt, Ltd.

[57] ABSTRACT

A channel-shaped sealing strip, such as for embracing, protecting and decorating the flange around the door opening of a vehicle body, comprises a channel-shaped metal core or carrier embedded in elastomeric material. The metal carrier comprises side-by-side U-shaped metal strip elements which overlap each other and are interconnected by short flexible and integral connecting links.

1 Claim, 6 Drawing Figures

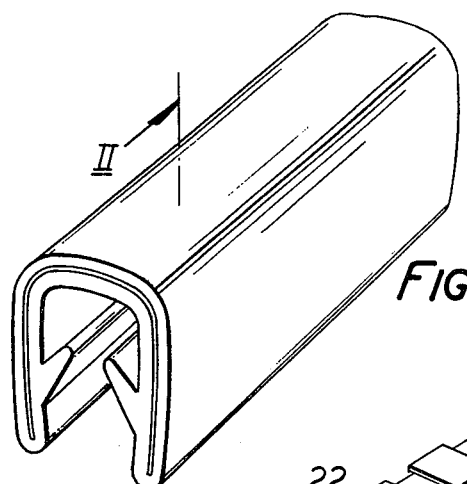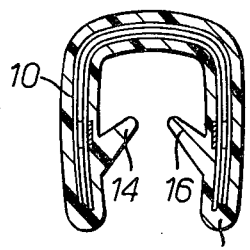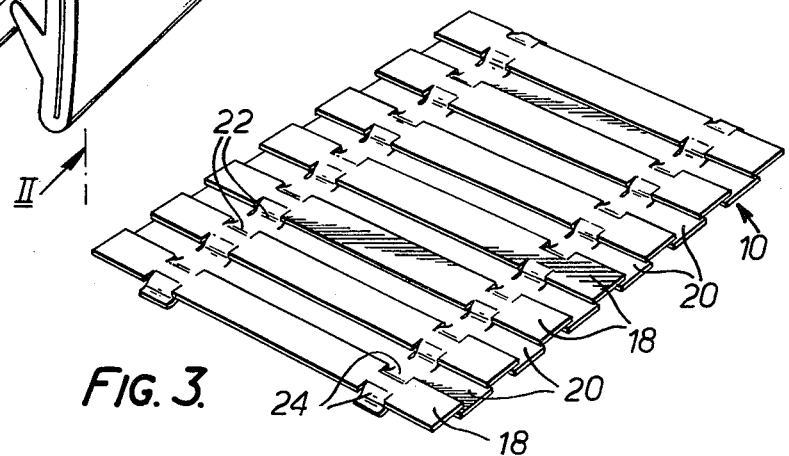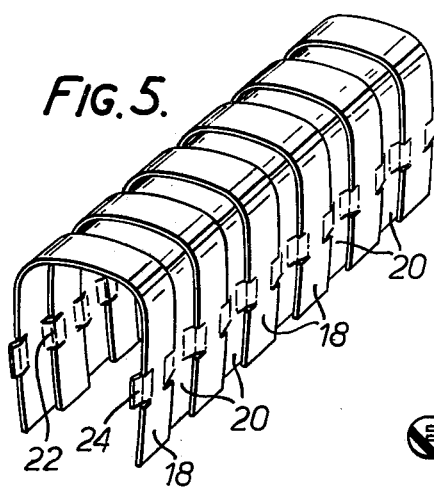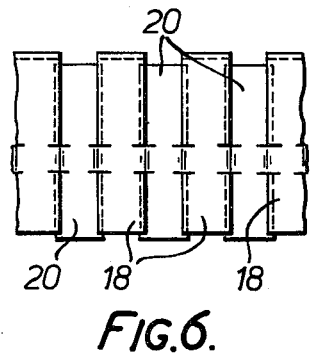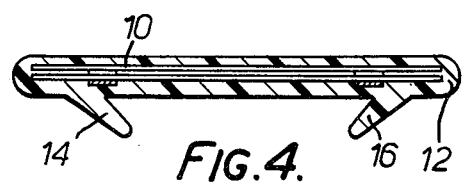

4,074,465

FLEXIBLE CHANNEL-SHAPED SEALING AND GUIDING STRIPS

BACKGROUND OF THE INVENTION

The invention relates to flexible channel-shaped sealing, finishing and guide strips for use as draft excluding seals, beadings, window channels, flange finishers (for covering welded flanges) and the like. Such strips are hereinafter referred to generically as "sealing strips", and are particularly, though not exclusively, for use in vehicle construction.

Sealing strips are known comprising a metal core or carrier which is covered by or embedded in elastomeric material. Known forms of metal core or carrier are made of wire or strip metal. Flexibility of the sealing strip about its longitudinal axis is highly desirable and, in an attempt to achieve this, it is known to make a metal carrier from a plurality of side-by-side U-shaped metal strip elements spaced from each other and either entirely disconnected or connected together by short connecting links, the carrier so formed being embedded in elastomeric material, for example by extrusion.

Such metal carriers suffer from a number of advantages. For example, the gaps between the metal carrier elements may cause the shape of the elements to become noticeable on the external surface of the elastomeric material giving an unacceptable or displeasing appearance.

On the other hand, a metal carrier made of continuous channel-shaped metal is unsatisfactory because it will have insufficient flexibility.

It is also desirable that a sealing strip shall be capable of some compression or extension lengthwise in order to provide take-up for length tolerance. A metal carrier comprising continuous channel-shaped metal, or one comprising spaced elements connected by short connecting links, may well have no, or insufficient, compressibility or extensibility.

It is an object of the invention to provide an improved metal carrier for a channel-shaped sealing strip.

A more specific object of the invention is to provide a metal carrier for a channel-shaped sealing strip which allows some lengthwise compressibility and extensibility for the sealing strip and also reduces the possibility of individual elements of the sealing strip becoming visible externally of the sealing strip.

A further object of the invention is to provide a metal carrier with good strength and flexibility and yet which is economical in the metal used.

BRIEF SUMMARY OF THE INVENTION

According to the invention, there is provided a metal carrier for reinforcing a channel-shaped sealing strip, comprising a plurality of strip-like elements arranged side-by-side with each alternate element substantially filling the gap between the elements on each side of it and being connected thereto over part only of its sides by connecting links.

DESCRIPTION OF THE DRAWINGS

A sealing strip embodying the invention for use as a flange finisher in vehicle construction will now be described, by way of example only, with reference to the accompanying drawings in which:

FIG. 1 is a perspective view of the sealing strip;
FIG. 2 is a section on the line II—II of FIG. 1;
FIG. 3 is a perspective view of the metal carrier used in the sealing strip and showing it at an early stage in manufacture of the sealing strip;
FIG. 4 is a section through the sealing strip at a later stage in manufacture;
FIG. 5 is a perspective view of the metal carrier alone, showing the form which it takes in the final sealing strip; and
FIG. 6 is a scrap side view of the metal carrier as it appears in FIG. 5.

DESCRIPTION OF THE PREFERRED EMBODIMENTS

As shown in FIG. 1 and 2, the sealing strip is channel shaped and incorporates a metal carrier member 10 which is covered with flexible covering material 12, such as plastics, rubber or other elastomeric material. The covering material 12 may be extruded over the metal carrier 10, and is arranged to define two re-entrant ribs 14 and 16 extending along the sealing strip.

In use, the sealing strip is placed over a supporting structure, such as a flange around an opening in a vehicle body, so that the supporting edge or flange is inserted into the channel shape of the sealing strip. The sealing strip grips the supporting edge, and the ribs 14 and 16 help to prevent inadvertent removal of the sealing strip and also provide a seal against the unwanted entry of water or moisture. In a manner to be described, the metal carrier 10 is designed to reinforce the sealing strip so as to ensure a firm grip on the supporting edge or flange, but at the same time to allow reasonable flexibility to the sealing strip so as to enable it to cope with bends or curves in the supporting edge or flange.

The metal carrier (FIG. 3) is initially in substantially flat form. As shown, it comprises a number of parallel strip-like elements 18 and 20. The members 18 are parallel to each other and all lie substantially in the same plane. Similarly, the members 20 are parallel to each other and all lie substantially in the same plane. However, the plane of the members 18 is spaced a small distance from (but parallel to) the plane of the members 20. The members 18 and 20 alternate along the length of the metal carrier and are interconnected by short integral connecting links 22 and 24. These connecting links are inclined to the planes of the elements 18 and 20 so as to connect between the members. As is apparent from FIG. 3, the links 22 and 24 are attached to the elements 18 and 20 not at the edges thereof but along lines spaced inwardly of the edges. This allows the elements 18 and 20 to overlap each other.

The carrier (in the form which it has in FIG. 3) may be produced by piercing and then slitting a flat blank using press tool manufacturing methods. The blank is then covered with flexible covering material 12, such as plastics material, preferably by an extrusion process such as of known "cross-head" type, so as to produce the arrangement shown in FIG. 4. This is then bent into U-form to produce the final sealing strip.

The plastics material on the outside of one leg of the U-form may be subjected to a "printing" or embossing process to form a pattern on it.

FIG. 5 shows the shape which the metal carrier 10 has in the final sealing strip. This Figure, together with FIG. 6, shows how the elements 18 and 20 overlap each other and are interconnected by the links 22 and 24.

The flexible interconnecting links 22 and 24 give the metal carrier a reasonable amount of flexibility in any direction about its longitudinal axis. The links may, however, be arranged to break either in use or during the manufacturing process (after the carrier has been covered with the material 12) so as to give improved flexibility.

Because the elements 18, 20 of the carrier overlap each other instead of, for example, being spaced apart by gaps across which interconnecting links extend, the carrier elements 18, 20 can be made of considerably thinner metal. In fact, the design is inherently so much stronger than that of a metal carrier with elements separated by gaps that the thickness of the elements can be reduced sufficiently so as more than to compensate for the greater number of elements, thus providing an overall saving in metal usage.

The metal carrier described is also advantageous in that the absence of air gaps between adjacent elements eliminates or minimises an inferior external appearance which can arise in finished strips where the shape of the elements becomes noticeable through the plastics covering material. However, although there are no gaps between the individual elements of the carrier, nevertheless it is still possible for the plastics material to force its way between the elements during the extrusion process so that the plastics material on either side of the carrier can connect, and a secure bonding of the plastics material to the surface of the carrier elements is not essential. This may eliminate the need for a bonding agent.

The overlapping arrangement of the elements of the carrier is advantageous in that it allows the finished sealing strip to be stretched or shrunk slightly to provide a take-up for length tolerance. However, it is not essential that overlap occur.

Although the sealing strip has been described as being manufactured by extruding the plastics material onto the flat carrier and thereafter bending the covered carrier into U-form, it is also possible to bend the carrier into U-form (that is, into the form shown in FIG. 5) and thereafter to extrude the plastics material over it.

It will be appreciated that the sealing strips described can be modified to suit other applications. If intended for a window guide channel, for example, the ribs 14 and 16 would normally be omitted.

What is claimed is:

1. A channel-shaped sealing strip, comprising a plurality of side-by-side strip-like metal elements each being of U-shape so as to define two legs and a base, each element overlapping the adjacent elements on each side of it but so that each pair of alternate elements overlaps the same face of the intervening element, flexible connecting links each connecting part only of the length of one leg of one of the elements to a corresponding part, only, of the adjacent leg of the next element and being integral with the connected elements, the elements being otherwise not directly connected to each other, the connecting links being attached to the elements along lines which are spaced inwardly of the elements from the side edges thereof, each connecting link extending between positions spaced from the distal ends of the two legs that it connects and extending between those positions in a direction inclined with respect to the major planes defined by the two legs the particular link connects, and a covering of elastomeric material completely enclosing the elements and their connecting links.

* * * * *